United States Patent [19]

Ichikawa

[11] Patent Number: 5,209,135

[45] Date of Patent: May 11, 1993

[54] IMPACT ABSORBING TYPE STEERING COLUMN DEVICE

[75] Inventor: Mitsuo Ichikawa, Maebashi, Japan

[73] Assignee: Nippon Seiko Kabushiki Kaisha, Tokyo, Japan

[21] Appl. No.: 687,004

[22] Filed: Apr. 18, 1991

[30] Foreign Application Priority Data

Apr. 23, 1990 [JP] Japan .............................. 2-42444[U]

[51] Int. Cl.⁵ .............................. B62D 1/19; F16F 7/12
[52] U.S. Cl. ....................................... 74/492; 280/777; 188/371
[58] Field of Search ..................... 74/492; 280/777; 188/371

[56] References Cited

U.S. PATENT DOCUMENTS

| | | | |
|---|---|---|---|
| 3,600,971 | 8/1971 | Scarvelis et al. | 74/492 |
| 3,868,864 | 3/1975 | Durkee et al. | 74/492 |
| 4,098,141 | 7/1978 | Yamaguchi | 74/492 |
| 4,630,716 | 12/1986 | Faust | 188/371 |
| 4,632,424 | 12/1986 | Morris | 280/777 |
| 4,703,669 | 11/1987 | Hyodo | 74/492 |
| 4,786,076 | 11/1988 | Wierschem | 280/777 |
| 4,838,576 | 6/1989 | Hamasaki et al. | 280/777 |
| 4,901,592 | 2/1990 | Ito et al. | 280/777 X |
| 4,943,028 | 7/1990 | Hoffmann et al. | 280/777 X |
| 4,989,898 | 2/1991 | Yamaguchi et al. | 280/777 |
| 4,998,999 | 3/1991 | Yuzuriha et al. | 74/492 X |
| 5,024,118 | 6/1991 | Khalifa et al. | 74/492 |
| 5,052,716 | 10/1991 | Matsumoto | 280/777 |
| 5,056,818 | 10/1991 | Sadakata | 280/777 |

FOREIGN PATENT DOCUMENTS

63-76578  5/1988  Japan.
64-16970  1/1989  Japan.

Primary Examiner—Leslie A. Braun
Assistant Examiner—Julie Krolikowski
Attorney, Agent, or Firm—Shapiro and Shapiro

[57] ABSTRACT

In an impact absorbing type steering column device, edges of a flat plate portion provided at an end portion of an energy absorbing member are bent to form bent-over sides which are attached to the outer surface of a steering column to provide a space where the energy absorbing member can be guidingly displaced.

2 Claims, 4 Drawing Sheets

IMPACT ABSORBING TYPE STEERING COLUMN DEVICE

BACKGROUND OF THE INVENTION

1. Field of the Invention

The present invention relates to an impact absorbing type steering column device designed to protect the driver of a vehicle in the event of a collision.

2. Related Background Art

In the event of a collision of an automobile, a so-called primary collision of the automobile with other vehicles etc. may be followed by a so-called secondary collision of the driver with the steering wheel.

Conventionally, in order to minimize the impact on the driver and thereby reduce the possibility of serious injury, the steering shaft (which holds the steering wheel securely at one end) has been made collapsible, and the steering column through which the steering shaft extends has been provided with an impact absorbing construction.

An example of such an impact absorbing type steering column device is disclosed in Japanese Utility Model Appln. Laid-Open No. 63-76578. This conventional impact absorbing type steering column device has a construction as shown in FIGS. 5-8.

In FIG. 5, 1 indicates a steering shaft, which holds a steering wheel 2 securely at its upper end and which is turned in a torsional direction by operating the steering wheel 2. This steering shaft 1 is constructed with a telescopic mechanism such as a spline joint (not shown) so as to collapse lengthwise when subjected to an axial impact.

3 indicates a tubular steering column, through which the steering shaft 1 extends. The steering column 3 is supported at both its center portion and lower end by a part of a vehicle body 4 such as the lower surface of the dashboard. More particularly the lower end of the steering column 3 is supported by a lower support bracket 5 fixed to a part of the vehicle body 4, so that it can slide axially.

An upper support bracket 6, which has been formed through bending a metal sheet, is fixed to the outer peripheral surface of the center portion of the steering column 3 such as by welding etc. For the attachment of the upper support bracket 6 to the vehicle body 4, a pair of mounting plates 7 are provided on both sides of the upper support bracket 6. Each mounting plate 7 comprises a U-shaped notch 8 opening at one end edge of the plate (the edge disposed toward the steering wheel 2).

9 indicates an elongate-C shaped lock member, which is fitted over the end edge of each mounting plate 7 so as to cover the open end of notch 8. A bolt 10 is inserted through a hole 15 made i the lock member 9 and through the notch 8, and is tightly screwed into a tapped hole provided in the vehicle body 4 so that the mounting plate 7 is clasped tightly by the lock member 9. In this way, the upper support bracket 6 is, via the lock member 9, supported by the vehicle body 4. Alternatively, the bolt 10 may be fixed to the body in advance, and a nut can be screwed on the bolt to secure the lock member 9 and exert a clamping force on the mounting plate 7.

An end portion of an energy absorbing member 11 is connected to each of the mounting plates 7 by welding. The other end of each energy absorbing member 11 comprises a hole 16, through which the corresponding bolt 10 is inserted. The energy absorbing member 11, which is made of a plastically deformable belt-like plate, comprises a U-shaped return 12 in its center portion, and the mounting plate 7 and a guide plate 13 described below clasp this return portion 12 from the upper and lower sides.

On each side of the upper support bracket 6, a respective guide plate 13, which is made through press forming of a metal sheet, is fixed below the mounting plate 7 by welding. A guide space 14 is thus provided between the upper surface of the guide plate 13 and the lower surface of the mounting plate 7 in order to guide the return portion 12 of the energy absorbing member 11.

The function of the above-described impact absorbing type steering column device to protect the driver in the event of a collision is described below.

When an impact is applied on a steering wheel 2 as a result of the secondary collision in an accident, the impact is instantaneously transmitted to the steering column 3, pushing this strongly in the axial direction.

When the impact force, which is applied on the steering column axially, is larger than the frictional force between the mounting plate 7 and the lock member 9 the notch 8 of the mounting plate 7 disengages from the bolt 10, thus releasing the steering column 3.

As a result, the steering column 3 is displaced forwardly in the axial direction (toward the left and downward in FIG. 5), and together with this displacement, the energy absorbing member 11 extends (see FIG. 8) by an amount depending on the impact force. When the energy absorbing member 11 extends from the condition shown in FIG. 5 to the condition in FIG. 8, the return 12 formed in the center portion of the energy absorbing member 11 moves away from the end connected to the bolt 10 (right side in FIG. 8) toward the other end connected to the mounting plate 7 (left side in the same drawing).

During this movement, the return portion of the energy absorbing member 11 undergoes plastic deformation to absorb the impact of the driver's body on the steering column 3 via he steering wheel 2. In addition, in the case of the embodiment in the drawings, a part of the upper surface of the guide plate 13 is tilted so that the guide space 14, where the return portion 12 of the energy absorbing member 11 is guided, may decrease gradually in height. Due to this configuration, the impact force absorbed increases gradually, enabling an effective impact absorption.

Although advantageous in terms of driver safety, the above-described device is problematic from a production point of view, particularly because the number of parts involved complicates parts control and assembly work, thereby increasing the cost. Consider, for example, the need for two energy absorbing members and two guide plates. Because all of these parts are prepared separately from the upper support bracket 6 and must be individually welded to the upper support bracket 6, parts control and assembly work are made more complicated and a high production cost cannot be avoided.

Another type of construction, in which only a single central energy absorbing member is provided, is disclosed in Japanese Utility Model Appln. Laid-Open No. 64-16970. However, it also requires a lot of parts, and accordingly, a high production cost is inevitable.

SUMMARY OF THE INVENTION

A principal object of the present invention is to provide an impact absorbing type steering column device, which is comprised of a small number of parts, and which is producible at a low cost.

The impact absorbing type steering column device according to the present invention, like the conventional device described above, may comprise a steering column through which extends a steering shaft holding a steering wheel at one end, left and right mounting plates which are fixed to the outer peripheral surface of the steering column for attachment to the vehicle body, a pair of notches respectively formed in the mounting plates and opening at corresponding end edges of the mounting plates, a pair of bolts respectively inserted through the notches and secured to the vehicle body so that the steering column is supported by the vehicle body via the pair of mounting plates, and an energy absorbing member.

In accordance with the present invention, the energy absorbing member may include a first end portion provided with a joint plate having a pair of holes respectively aligned with the notches of the mounting plates and through which the aforementioned bolts are respectively inserted such that the joint plate is attached to the vehicle body, an intermediate portion displaced from the first end portion along the length of the steering column and bent back toward the first end portion to form a U-shaped first return, and a second end portion folded by 180° in a direction opposite to the first return to form a second return with a radius of curvature substantially smaller than that of the first return. The second end portion has an integral plate portion with opposite side portions bent toward the first return to form a pair of bentover sides embracing the first return. The energy absorbing member is joined to an attachment portion of the steering column at the bent-over sides such that the first return is clasped between the attachment portion of the steering column and the plate portion of the energy absorbing member.

As will be more fully appreciated hereinafter, the present invention, by virtue of its unique construction, avoids the need for a pair of energy absorbing members as well as the need for separately prepared guide plates, as have characterized the earlier-discussed conventional construction. The invention consequently simplifies parts control procedures and production processes, thus reducing the cost of production.

DESCRIPTION OF THE PREFERRED EMBODIMENT

The present invention will now be described in detail with reference to the embodiment shown in FIGS. 1-4 of the drawings.

Figure 5:
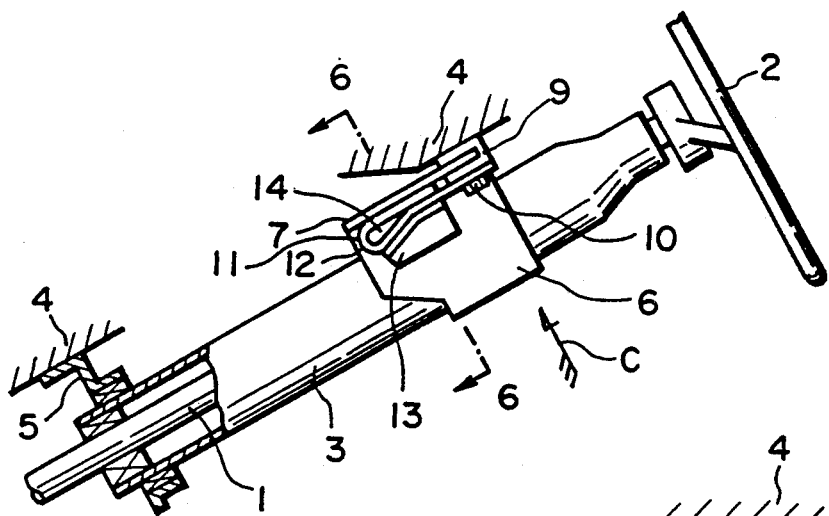
FIG. 5 is a partly sectional side view of a conventional impact absorbing type steering column device.
Figure 6:
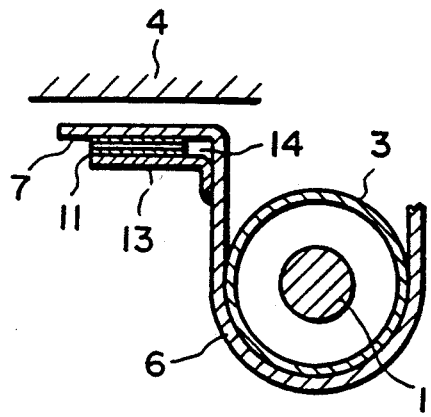
FIG. 6 is a sectional view taken along the line 6—6 in FIG. 5.

In the illustrative embodiment, 3 indicates a steering column, which is made of aluminum alloy, for example. A steering shaft 1, which securely holds the steering wheel 2 (see FIG. 5, not shown in FIG. 1) at one end (the right end in FIG. 1), is inserted in the steering column so as to be freely rotatable therein. Mounting plates 7 for attachment to the vehicle body are formed integrally with the outer peripheral surface of the center portion of this steering column 3.

Steering column 3 is of a so-called telescopic type and includes an outer column 17, a lower inner column 18 and an inner column 34 combined together to constitute a telescopic body. The upper column 34 is movable in the axial direction (horizontal direction in FIGS. 1 and 2) via a worm 19, a nut 20 and a threaded rod 21 which are driven by an electric motor in order to enable the forward and backward adjustment of the steering wheel 2. A lower support bracket 22 fixes the lower end of inner column 18 to the vehicle body. The lower inner column 18 and the outer column 17 are arranged so that the steering column 3 can be collapsed lengthwise when a strong force is applied in the axial direction. Therefore, it is not necessary to construct the lower support bracket 22 so as to permit axial displacement, unlike the case of lower support bracket 5 in the conventional construction shown in FIG. 5.

Figure 7:
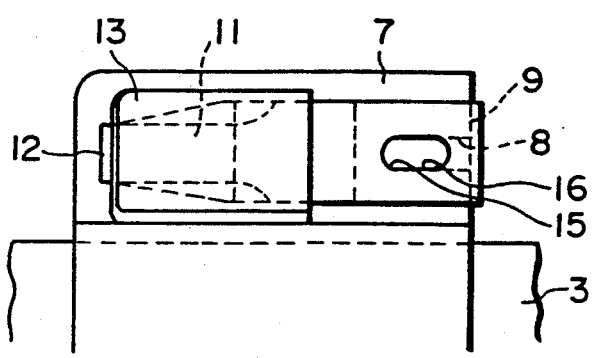
FIG. 7 is a view seen in the direction of the arrow C in FIG. 5.
Figure 8:
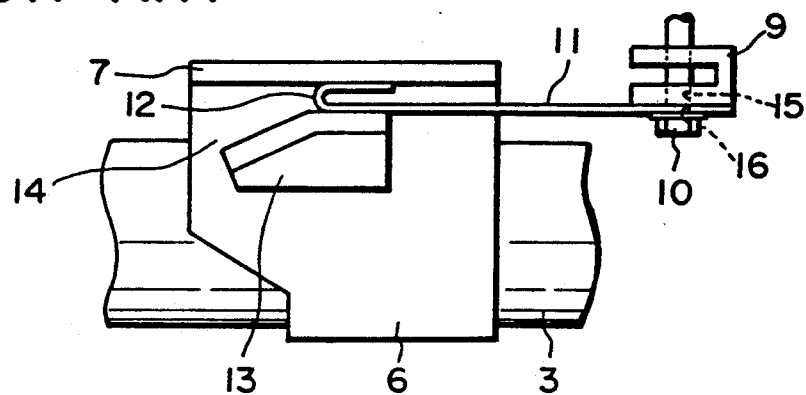
FIG. 8 is a side view showing the condition of a portion of the FIG. 5 device after an impact is absorbed in a collision.

Each of the left and right mounting plates 7 comprises a notch 8 (see FIG. 7) which opens at one end edge (the right end edge in FIGS. 1 and 2) of the plate, and a corresponding lock member 23 (see the upper half of FIG. 2) is mounted so as to cover the open end of the notch 8. This lock member 23 comprises a hole 24 through which the corresponding bolt 10 (see FIG. 5) is inserted.

Figure 1:
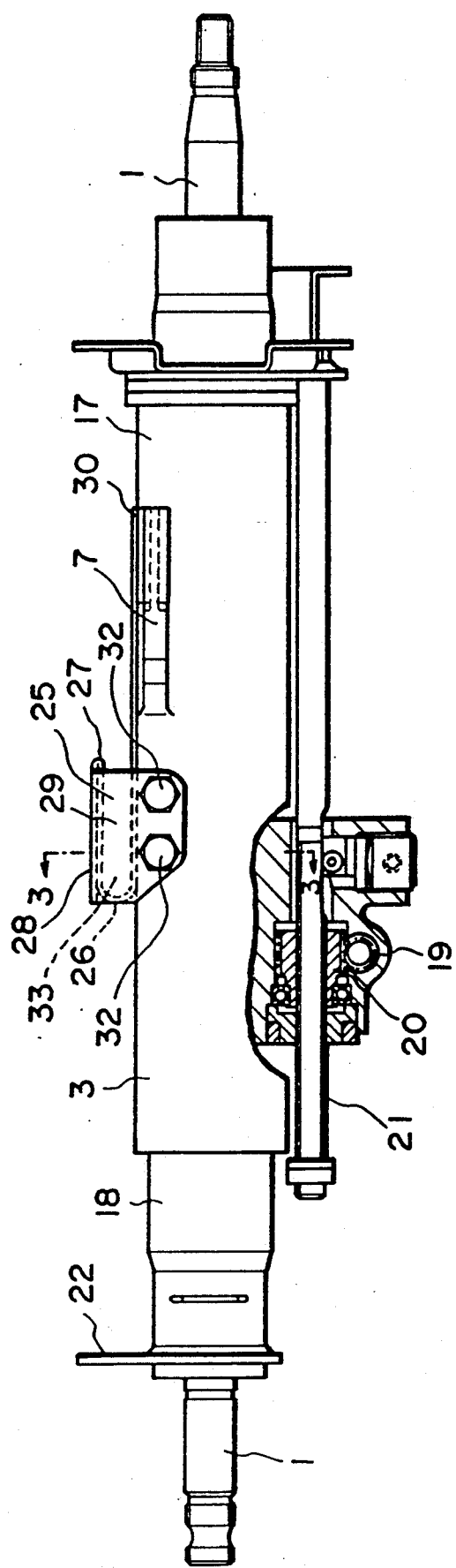
FIG. 1 is a partially cut away longitudinal side view showing the general arrangement of an embodiment of the present invention.
Figure 2:
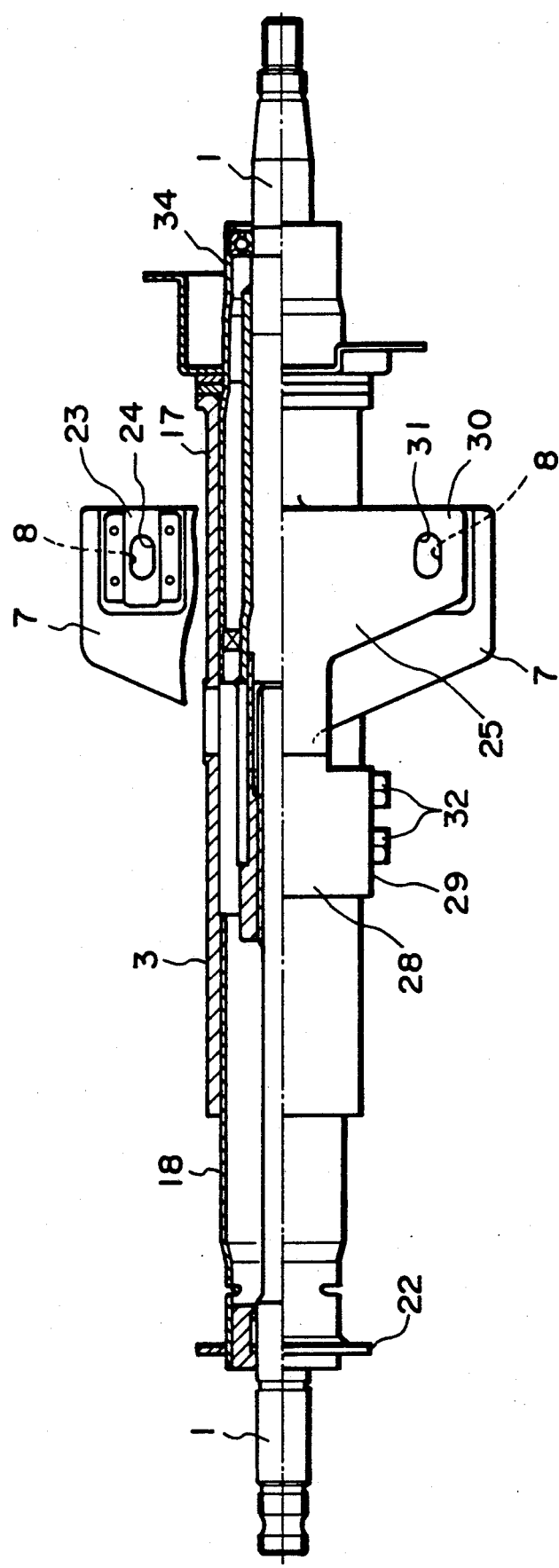
FIG. 2 is a partly sectional plan view of the embodiment of FIG. 1.
Figure 3:
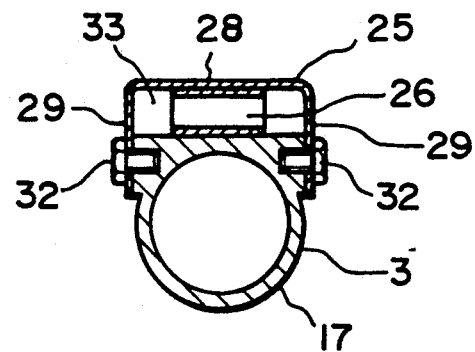
FIG. 3 is a sectional view taken along the line 3—3 in FIG. 1.
Figure 4:
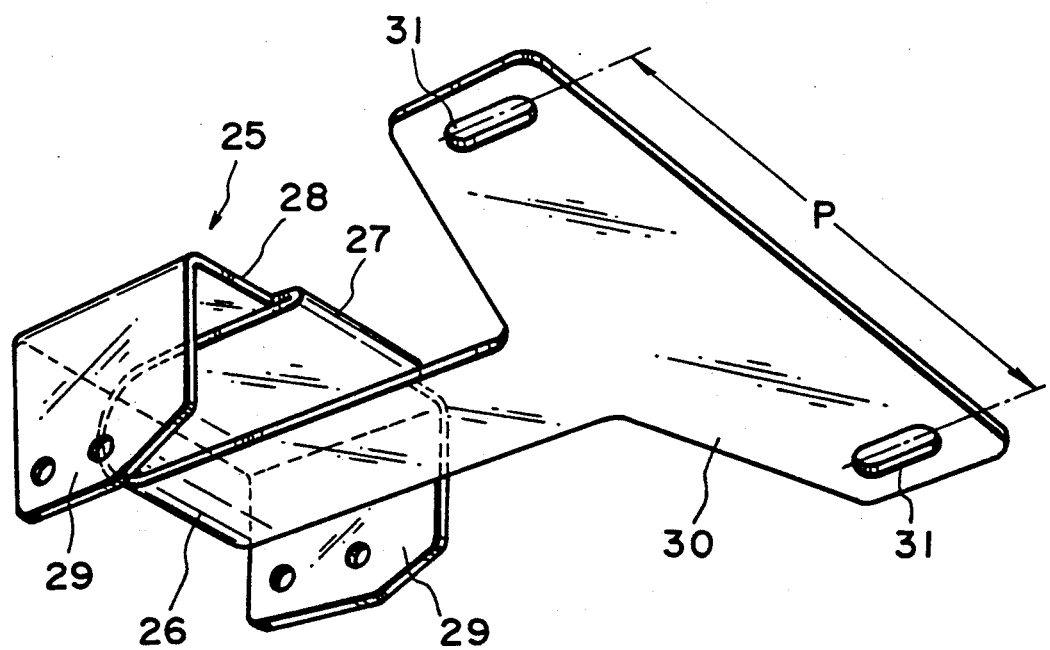
FIG. 4 is a perspective view of the energy absorbing member of the present invention.

For the purpose of absorbing impact due to secondary collision, there is provided an energy absorbing member 25 made out of a plastically deformable belt-like plate material and having a configuration as is shown in FIG. 4.

More particularly, a U-shaped first return 26 is provided in the center portion of the energy absorbing member 25, and one end of energy absorbing member 25 is folded back 180° in the opposite direction to the first return portion 26 to form a second return portion 27 having a radius of curvature substantially smaller than that of the first return portion 26. At this end, a flat plate portion 28 is formed integrally with the energy absorbing member 25, and the front and back edges of the flat plate portion 28 are bent 90° toward the first return portion 26 (toward the bottom in FIGS. 1, 3 and 4) at both sides of the plate portion to form a pair of bent-over sides 29.

The other end of the energy absorbing member 25 comprises a wide joint plate portion 30 having holes 31 toward both the left and right sides of this joint plate 30. The pitch p of this pair of holes 31 is made equal to that of the notches 8 formed on the pair of mounting plates 7, and the bolts 10, which are inserted through the notches 8 and the holes 24 of the lock members 23, are also inserted through the holes 31. With the bolts 10 arranged as such and tightly screwed into the corresponding tapped holes in the vehicle body, the mounting plates 7 are supported by the vehicle body and the joint plate portion 30 is non-separably connected to the bolts 10. It is alternatively possible to pre-fix the bolts 10 to the vehicle body and then later to tighten nuts on the bolts in order to secure the joint plate portion, the lock members and the mounting plates.

The lower end portions of the pair of bent-over sides 29 are bolted onto the outer side surface of the center portion of the outer column 17 by bolts 32. In this way, the energy absorbing member 25 is fixed to the upper surface of the outer column 17 and the first return portion 26 of the energy absorbing member 25 is clasped between the upper surface of the outer column 17 and the lower surface of the flat plate portion 28.

The principle of operation of the impact absorbing type steering column device constructed as described above is substantially the same as that of the conventional impact absorbing type steering column device described earlier.

More particularly, in the event of an accident, an impact is applied on the steering wheel 2 (see FIG. 5) as a result of the secondary collision, and the steering column 3 is pushed strongly in the axial direction. When the impact applied in the axial direction of the steering column 3 is larger than the frictional force acting between the mounting plates 7 and the lock members 23, the notches 8 formed in the mounting plates 7 disengage (move forward) from the bolts 10. The steering column 3 moves forward in the axial direction (to left in FIG. 1) based on the impact force, causing the energy absorbing member 25 to extend.

When the energy absorbing member 25 is so caused to extend, the first return 26 formed in the center portion of the energy absorbing member 25 is displaced within the guide space 33 between the flat plate portion 28 and the upper surface of the outer column 17 (that is, the first return portion 26 moves toward the second return portion 27).

The impact energy of the secondary collision is absorbed by the foregoing action, due to the plastic deformation of the energy absorbing member 25 accompanied by the displacement of the first return portion 26. The driver is thereby protected against possible serious injury due to the secondary collision.

It will be appreciated from the preceding description that the present invention obviates the need for the separately prepared and individually welded guide plates 13 of the earlier described conventional construction, while also avoiding the need for a pair of energy absorbing members. Consequently, parts control procedures and production processes can be simplified, enabling a substantial cost reduction.

Also, as will be apparent to those skilled in the art, the above-described embodiment is merely illustrative of the present invention, and various changes and modifications are possible within the broader scope of the invention as defined in the appended claims.

I claim:

1. An impact absorbing type steering column device, comprising a steering column through which extends a steering shaft having one end at which a steering wheel is secured; left and right mounting plates fixed to an outer surface of said steering column for attachment to a vehicle body; a pair of reentrant notches formed respectively in corresponding edges of said mounting plates; a pair of bolts respectively inserted through said notches and fixing said steering column to said vehicle body via said mounting plates; and an energy absorbing member including a first end portion provided with a joint plate having a pair of holes respectively aligned with said notches and through which said bolts are respectively inserted such that said joint plate is attached to said vehicle body, an intermediate portion displaced from said first end portion along the length of said steering column and bent back toward said first end portion to form a U-shaped first return, and a second end portion folded by 180° in a direction opposite to said first return to form a second return with a radius of curvature substantially smaller than that of said first return, said second end portion having an integral plate portion with opposite side portions bent toward said first return to form a pair of bent-over sides embracing said first return; and wherein said energy absorbing member is joined to an attachment portion of said steering column at said bent-over sides such that said first return is clasped between said attachment portion of said steering column and said plate portion of said energy absorbing member.

2. An impact absorbing type steering column device according to claim 1, wherein said energy absorbing member is joined to said attachment portion at each of said bent-over sides by bolt means.

* * * * *